Patented Feb. 10, 1925.

1,525,654

UNITED STATES PATENT OFFICE.

MARIE ELIESABETH MITTAG, OF BROOKLYN, NEW YORK.

POLISHING COMPOSITION AND METHOD OF MAKING THE SAME.

No Drawing.   Application filed February 19, 1924.   Serial No. 693,921.

*To all whom it may concern:*

Be it known that I, MARIE ELIESABETH MITTAG, a citizen of the United States, and a resident of the borough of Brooklyn, county of Kings, city and State of New York, have invented an Improvement in Polishing Compositions and Methods of Making the Same, of which the following is a specification.

The present invention relates to an improvement in polishing compositions and methods of making the same, and has to do more particularly with a composition which has been found useful in cleaning and polishing surfaces as of wood and the like.

A composition according to my invention includes a mixture of crude oil, vinegar, lemon oil, turpentine and spirits of camphor. I find that an effective furniture polish is produced by intimately mixing one and one-half pints of lemon oil with one-half pint turpentine and stirring the same vigorously until the mixture approaches a creamy consistency. I also mix one-half gallon of crude oil with one and one-half pints of vinegar and stir the same vigorously until the mixture approaches a creamy consistency. I then add the lemon oil and turpentine mixture to the crude oil and vinegar mixture, stirring the same vigorously and then add fifteen drops of spirits of camphor.

The proportions set forth in the above described example of my composition for furniture polish are such as have been found to produce very good results, although it is possible to vary these proportions considerably without noticeably affecting action of the ultimate mixture. The lemon oil when combined as above set forth adds materially to the cleansing effectiveness of the composition and particularly in the removal of grease and the like. The spirits of camphor, when combined as above set forth, performs the function of removing bloom and other discolorations of varnished surfaces such as may be caused by accidental spilling of hot liquids or the placing of a hot dish upon the varnished object.

I claim as my invention:

1. A polishing composition composed of about three-sixteenths by volume of lemon oil, one-sixteenth by volume of turpentine, one-half by volume of crude oil, three-sixteenths by volume of acetic acid, and a fraction of one per cent of spirits of camphor.

2. The method of making a polishing composition which includes combining lemon oil and turpentine in substantially the proportions specified and agitating the mixture until it attains a creamy consistency, combining crude oil and acetic acid in substantially the proportions specified and agitating the mixture, adding the first mentioned mixture to the second mentioned mixture, then adding spirits of camphor in substantially the proportion specified.

In testimony whereof, I have signed my name to this specification this 18th day of February 1924.

MARIE ELIESABETH MITTAG.